H. C. GLADDING.
SASH-HOLDER.

No. 188,511.    Patented March 20, 1877.

Witnesses.
Socrates Scholfield
J. W. Emmons

Henry C. Gladding.

UNITED STATES PATENT OFFICE.

HENRY C. GLADDING, OF PROVIDENCE, RHODE ISLAND.

IMPROVEMENT IN SASH-HOLDERS.

Specification forming part of Letters Patent No. 188,511, dated March 20, 1877; application filed September 16, 1876.

*To all whom it may concern:*

Be it known that I, HENRY C. GLADDING, of Providence, in the State of Rhode Island, have invented an Improved Window-Spring or Sash-Holder, of which the following is a specification:

The nature of my invention consists in a spring and lever so combined that a bend made in the shank of the spring may constitute the fulcrum on which the lever is made to operate against the side of the window-frame, requiring but one screw to secure the spring firmly to the sash, as hereinafter more fully described and definitely claimed.

Figure 1:
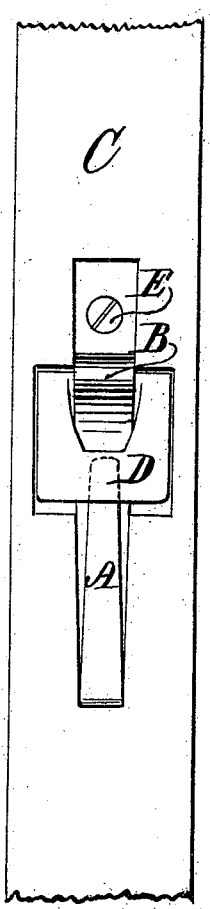
Figure 2:
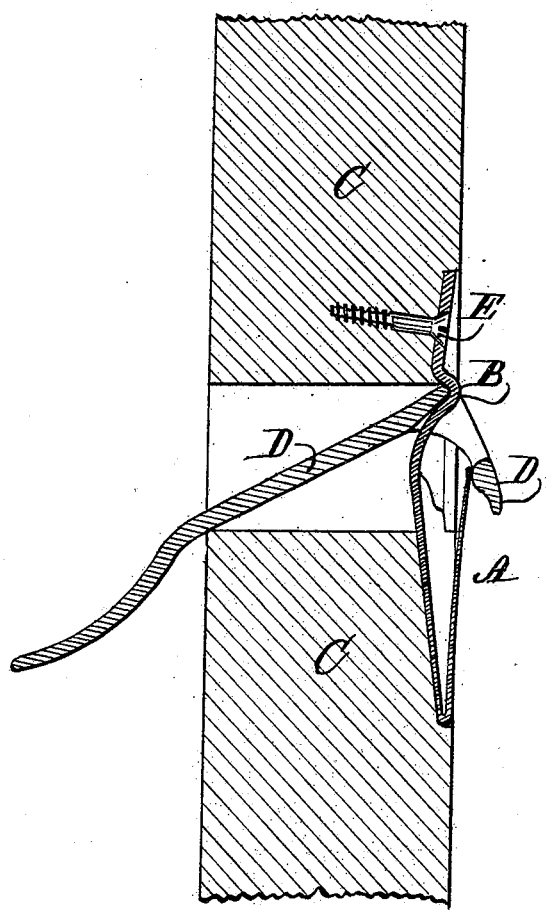

Figure 1 is an edge view of the sash, showing the spring attached to the same. Fig. 2 is a sectional side view, illustrating the several parts.

A is the spring, having a bend at the point B, to receive and seat the forward end of the lever D, so that when the spring is secured to the sash C by means of the screw E the lever D will be held so as to be pivoted at the point B.

I claim as my invention—

The lever D, with its fulcrum in the bend B of the spring A, substantially as described, for the purpose set forth.

HENRY C. GLADDING.

Witnesses:
    SOCRATES SCHOLFIELD,
    ALBA R. ABBOTT.